(12) United States Patent
Kumhyr

(10) Patent No.: US 6,295,050 B1
(45) Date of Patent: Sep. 25, 2001

(54) JOY STICK POINTING DEVICE TO CONTROL THE MOVEMENT OF A GRAPHICAL ELEMENT ON A COMPUTER DISPLAY MONITOR

(75) Inventor: David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,497

(22) Filed: Mar. 18, 1999

(51) Int. Cl.[7] ........................................... G09G 5/08
(52) U.S. Cl. ............................................. 345/161
(58) Field of Search ................... 345/156, 157, 345/161, 163, 168; 341/20, 22; 700/83, 84, 85; 463/37, 38

(56) References Cited

U.S. PATENT DOCUMENTS

| | | | |
|---|---|---|---|
| 4,395,134 | * 7/1983 | Luce | 368/3 |
| 4,825,019 | 4/1989 | Fisher | 345/157 |
| 4,945,357 | 7/1990 | Tal | 341/20 |
| 5,521,596 | 5/1996 | Selker et al. | 345/161 |
| 5,532,476 | * 7/1996 | Mikan | 345/161 |
| 5,568,987 | 10/1996 | Franz . | |
| 5,594,618 | 1/1997 | Sellers | 345/168 |
| 5,615,083 | * 3/1997 | Burnett | 345/161 |
| 5,640,178 | 6/1997 | Endo et al. | 345/161 |
| 5,659,334 | 8/1997 | Yaniger et al. | 345/156 |
| 5,701,142 | 12/1997 | Brown et al. . | |
| 5,708,562 | * 1/1998 | Agata et al. | 345/161 |
| 5,786,806 | * 7/1998 | Fester | 345/161 |
| 5,831,596 | * 11/1998 | Marshall et al. | 345/161 |
| 5,870,082 | 2/1999 | Selker et al. . | |
| 5,889,507 | 3/1999 | Engle et al. | 345/161 |
| 5,889,508 | 3/1999 | Slotta | 345/161 |
| 5,949,404 | * 9/1999 | Zabel | 345/161 |
| 5,966,117 | * 10/1999 | Seffernick et al. | 345/161 |
| 6,002,388 | * 12/1999 | Seffernick et al. | 345/161 |
| 6,040,823 | 3/2000 | Seffernick et al. | 345/168 |
| 6,059,660 | * 5/2000 | Takada et al. | 345/161 |
| 6,107,993 | * 8/2000 | Devolpi | 345/161 |

OTHER PUBLICATIONS

Mini–joystick: An Integrated Terminal Key Combination, IBM Technical Disclosure Bulletin, Sep. 1991, V34 pp. 440–444.*

Telescopic Joystick, IBM Technical Disclosure Bulletin, Apr. 1989, V31 pp. 288–289.*

* cited by examiner

*Primary Examiner*—Steven Saras
*Assistant Examiner*—Paul A. Bell
(74) *Attorney, Agent, or Firm*—David W. Victor; Konrad Raynes & Victor LLP

(57) ABSTRACT

Disclosed is a pointer assembly apparatus in communication with sensor electronics embedded within a keyboard assembly to sense mechanical movement. The sensor electronics communicates electrical signals indicating direction of movement to a computer system which controls the movement of a graphical element displayed on an attached display monitor. The pointer assembly comprises an extended member coupled to the sensor electronics that extends at least one-half an inch away from a horizontal surface of the keyboard assembly. With this structure, the user may grip the extended member between two finger tips to control movement of the displayed graphical element.

18 Claims, 4 Drawing Sheets

JOY STICK POINTING DEVICE TO CONTROL THE MOVEMENT OF A GRAPHICAL ELEMENT ON A COMPUTER DISPLAY MONITOR

BACKGROUND OF THE INVENTION

1. Field of the Invention

The present invention relates to an apparatus for controlling the movement of a graphical element on a computer display monitor that is engaged with a keyboard assembly and provides improved control over movement of the graphical element.

2. Description of the Related Art

Current computer keyboards, especially those provided with a laptop computer, sometimes include a pointing device embedded between the keys of the keyboard. This pointing device typically looks and feels like an eraser. FIG. 1 illustrates this eraser style pointing device 2 embedded between keyboard keys 4. FIG. 1 also shows lateral views, referenced as 6a and 6b, of the eraser-style pointing device with respect to the keyboard keys. The user may control the eraser pointing device 2 with a fingertip, usually the forefinger, to move the eraser pointing device in directions along the X-Y plane to control the movement of a cursor or other graphical element displayed in a graphical user interface (GUI) on a computer display monitor. The eraser pointing device 2 remains relatively stationary when the user applies pressure in different directions. One example of the eraser pointing device is the International Business Machine Corporation ("IBM") TrackPoint in-keyboard pointing device.

Such eraser pointing devices 2 are particularly advantageous because they fit into a laptop computer keyboard and provide the user mouse-like control within the keyboard area. In the prior art, the height of such eraser pointing devices 2 extends to the height of the keys on the keyboard or only very slightly above the keys, such as by an eighth of an inch or less. Prior art eraser pointing devices 2 are shaped as a button as shown in FIG. 1. The height and shape of the eraser type pointer device is designed to insure that the eraser pointing device 2 will not puncture or damage the LCD display screen of a laptop computer when the display screen cover is shut closed and positioned flush with the keyboard and eraser pointing device 2. Examples of eraser pointing devices such as the device shown in FIG. 1 are described in the following U.S. patents, all of which are incorporated herein by reference in their entirety: U.S. Pat. No. 5,701,142, entitled "Pointing Stick with Tripod Actuator for Cursor Control in a Computer Keyboard;" U.S. Pat. No. 5,568,987, entitled "Pointing Stick in a Computer Keyboard for Cursor Control;" and the commonly assigned U.S. Pat. No. 5,870,082, entitled "Pointing Device With Reciprocating Grip Cap."

One problem with the current eraser style pointing devices is that users have limited control over movement in the X-Y plane. This limitation in movement is especially problematic when playing computer video games. Computer games such as flight simulators and other action games typically require quick, accurate user movements. The eraser style pointing devices do not provide the user the desired level of control over cursor or game element movement in the X-Y plane to adequately interact in the computer gaming environment.

There is thus a need in the art for a pointing device suitable for being embedded in a keyboard and particularly suited for laptop use to provide users greater control over the movement of cursors and other displayed graphical elements.

SUMMARY OF THE PREFERRED EMBODIMENTS

To provide an improved pointing device structure, preferred embodiments disclose a pointer assembly apparatus in communication with sensor electronics embedded within a keyboard assembly to sense mechanical movement. The sensor electronics communicates electrical signals indicating direction of movement to a computer system which controls the movement of a graphical element displayed on a display monitor attached to the computer. The pointer assembly comprises an extended member coupled to the sensor electronics that extends at least approximately one-half of an inch away from a horizontal surface of the keyboard assembly. With this structure, the user may grip the extended member between two finger tips.

In further embodiments, the keyboard assembly includes a shaft member disposed within the keyboard assembly and coupled to the sensor electronics at one end. An engagement end of the extended member is engaged to the shaft member. The shaft member communicates mechanical movement from the extended member to the sensor electronics.

In embodiments where the computer system is a laptop computer and the display monitor is a laptop screen, a polymer forming the extended member may be designed to deform in response to stress from the laptop screen being closed shut onto the extended member and to return to an original shape after the stress is removed. In still further laptop computer embodiments, the extended member may be formed of a brittle polymer portion and subject to shattering in response to stress resulting from the laptop screen being closed shut onto the extended member. These two structures would substantially reduce the likelihood that inadvertently shutting the laptop cover onto the extended member would damage the laptop display screen.

Preferred embodiments further provide a user increased leverage and improved control over movement of a cursor or other graphical display than that provided by eraser-style pointing devices typically used with laptop computers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
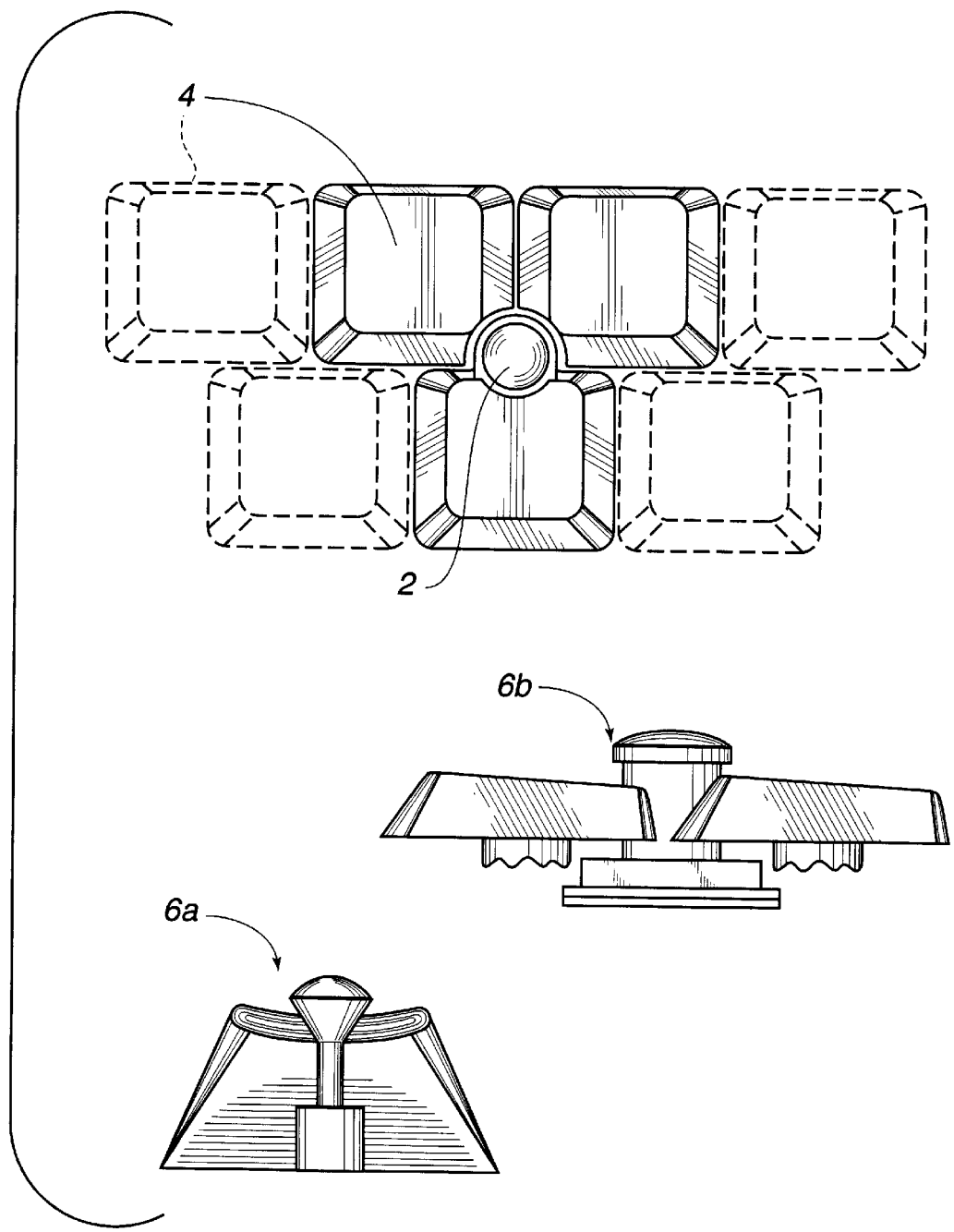
FIG. 1 illustrates prior art eraser-style pointing devices typically used with a laptop computer.
Figure 2:
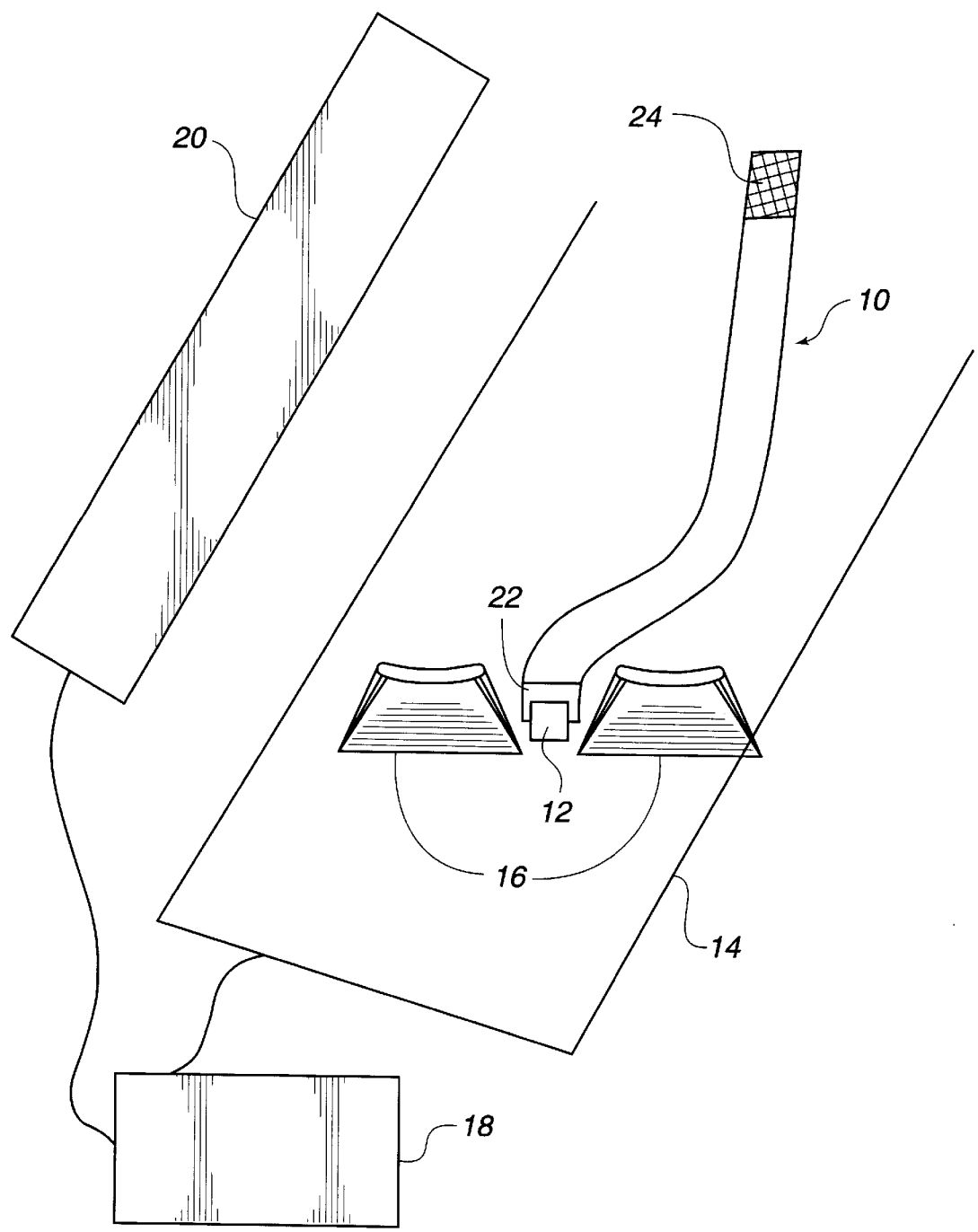
FIG. 2 is a perspective view of the joystick member in accordance with preferred embodiments of the present invention.

FIG. 2 illustrates a perspective view of a joy stick apparatus in accordance with preferred embodiments of the present invention. A joy stick member 10 is mated to a shaft 12 on a keyboard 14 and positioned between keyboard keys 16. The joystick member 10 may be disposed between three or four keyboard keys, such as between the "G", "B", and "H" keys. The shaft 12 would be coupled to an actuator plate (not shown) within the keyboard 14 housing to communicate mechanical forces transmitted from the joystick member 10 to a force sensor apparatus or sensor electronics (not shown). The sensor electronics then communicates the sensed signals indicating direction and magnitude of movement to a computer 18, which in turn controls the movement of a graphical element displayed on display monitor 20 according to directional and magnitude information indicated in the sensed signals. The computer 18, display 20, and keyboard 14 may be part of any computer system known in the art, including a laptop computer, desktop computer, palmtop or hand held computer, etc. The sensed signals may indicate movement along the X, Y, and Z axis, as described in U.S. Pat. No. 5,568,987, which patent was incorporated by reference above. For instance, in computer games, the movement of the shaft 12 via the joy stick member 10 could move a graphical element of game control, such as an airplane, person, weapon, vehicle or any other game control feature.

The joy stick member 10 includes a hollow bottom portion 22 that has a physical configuration, i.e., shape, to allow it to removably mate with the shaft 12. Preferably the joy stick member 10 has a larger outer diameter than the outer diameter of the shaft 12. Further, the outer diameter of the bottom portion 22 of the joystick member 10 that is disposed between the keys 16 must have a diameter such that the bottom portion 22 may fit between the keys 16 on the keyboard 14. The outer diameter of the hollow bottom portion 22 must be small enough to allow the bottom portion 22 to be easily inserted and removed from the space between the keys 16 where the bottom portion 22 is intended to fit. The outer diameter of the bottom portion 22 must also be sufficiently small such that the keys 16 will not interfere with the range of joystick movement. The upper end of the joystick member 10, opposite the bottom portion 22, may be covered with a gripping material 24 to provide the user improved gripping of the joystick member 10. In preferred embodiments, the joystick member 10 is designed to be gripped between two finger tips, such as the thumb and forefinger.

Figure 3:
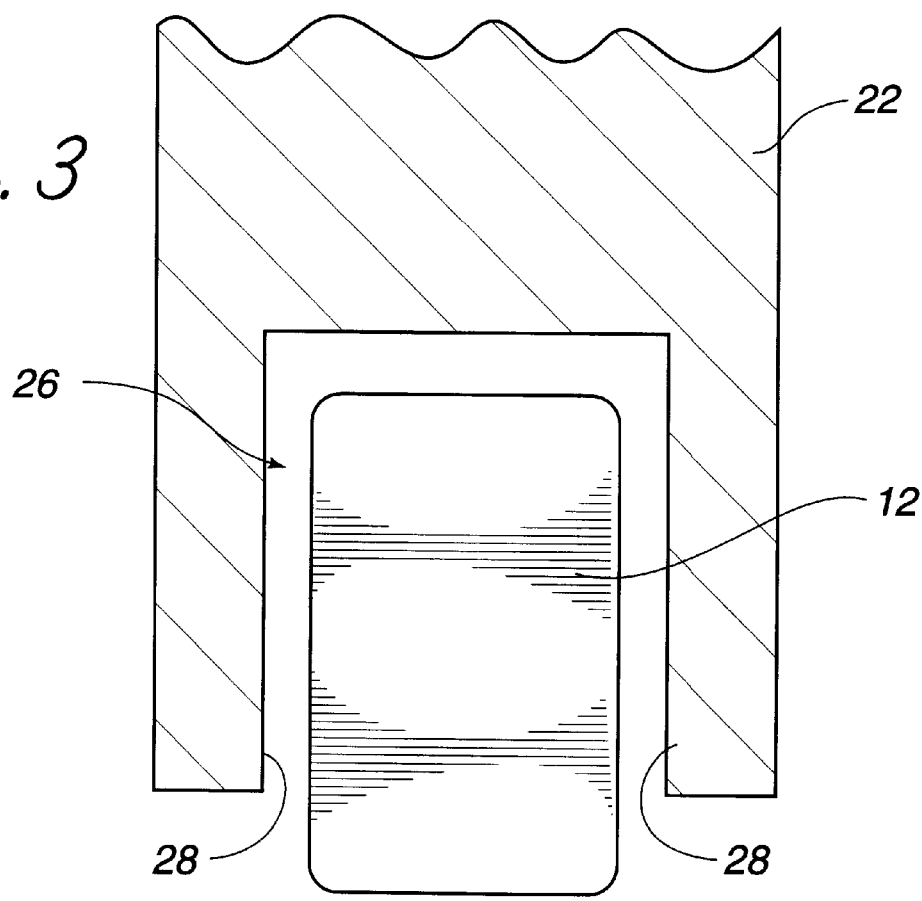
FIG. 3 is a vertical cross-sectional view of the joystick member in accordance with preferred embodiments of the present invention.
Figure 4:
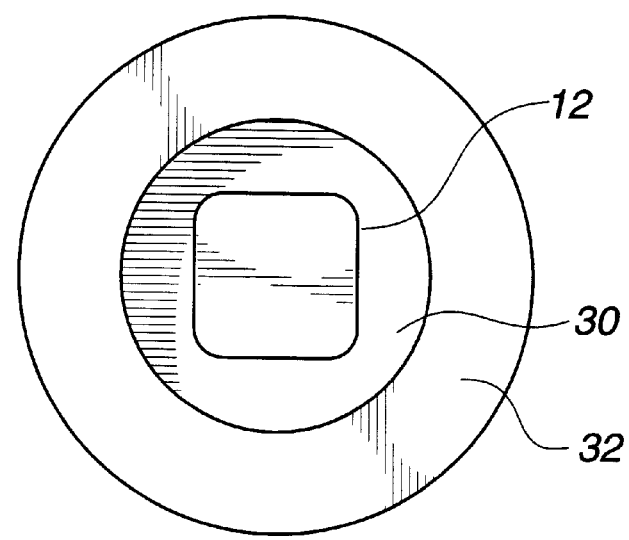
FIG. 4 is a horizontal cross-sectional view of the joystick member in accordance with preferred embodiments of the present invention.

FIG. 3 illustrates a vertical cross-sectional view of the bottom portion 22 of the joystick member 10 removably mated to the shaft 12. The bottom portion 22 has an interior opening, shown as 26, that is shaped to fit over the shaft 12 protrusion between the keys 16 of the keyboard 14. In preferred embodiments, an inner surface 28 of the bottom portion 22 that mates with the shaft 12 is comprised of a resilient material that may be compressed slightly when mated with the shaft 12. Alternatively, the inner surface 28 that mates with the shaft 12 may be comprised of a rigid material that fits tightly or snaps into place with respect to the shaft 12. The material that forms the inner surface 28 and other sections of the bottom portion 22 may be comprised of the same material. FIG. 4 illustrates a horizontal cross-sectional view of the bottom portion 22 comprised of two material types 30, 32 mated with the shaft 12. The first material 30 forms the inner surface 28 of the bottom portion 22 that engages the shaft 12. The second material 32 comprises the remainder of the bottom portion 22 and may be of a different type of material, e.g., rigid or resilient, from the first material 30. Further the portion of the joystick member 10 above the bottom portion 22 may be comprised of the same or different materials comprising the bottom portion 22.

The joystick member 10 may be comprised of a single type of material or different sections may be formed from a variety of materials, such as, for example polymers. For laptop computer use, the joystick member 10 may be comprised of softer polymers to form a flexible, resilient control stick. A variety of polymeric compounds, including, but not limited to, polybutyl and ABS (acrylonitrile, butadiene, and styrene) may be used to form the joystick member 10 such that the joystick member 10 is capable of deforming under stress and then regaining its original shape after the stress is removed. In this way, if the laptop cover is shut closed, the joystick member 10 will be deformed and pushed downward, i.e., sandwiched, between the keyboard 14 and display screen in the closed position. Forming the joystick member 10 from such softer flexible and resilient polymers will substantially decrease the likelihood that the laptop screen would be damaged from forcing the display screen onto the joystick member 10 engaged with the shaft 12 when closing the laptop cover.

In alternative embodiments, the joystick member 10 may be formed from more brittle polymers (or other materials) that are intended to shatter and break if sufficiently stressed, e.g., the laptop case is shut closed on the joystick member 10. Moreover, a region of the joystick member 10 may be designed as a breakpoint to break-off as a result of the laptop case being shut closed onto the mounted joystick member 10. The breakpoint area may include less material than other portions of the joystick member 10 or be comprised of an especially hard brittle polymer more susceptible to shattering from the stress of the laptop cover being shut closed onto the joystick member 10. Preferably, the breakpoint is located above the keyboard 14 surface away from the shaft 12. In this way, the joystick member 10 will break above the bottom portion 22 and shaft 12 region in a manner that avoids damaging the shaft 12 and sensor electronics. In fact, the shaft 12 may be comprised of a tougher, less brittle polymer than the joystick member 10. This will further increase the likelihood that the joystick member 10 will shatter or breakaway without damaging the shaft 12 or sensor electronics.

In yet further embodiments, the extended member 10 may be formed of a tough, rigid material to provided added leverage and greater control over movement. The more flexible, resilient polymers absorb more user force than the rigid members, which more readily transfer the user force to the sensor mechanism. However, the rigidity or toughness of the material used to form the joystick member 10 must be limited so as not to provide the user with a degree of leverage that would allow normal movements to transfer enough force to damage the shaft 12 and/or sensor electronics in the keyboard 14. Although a more rigid, less brittle polymer has desirable control characteristics, the user must remember to remove such a rigid joystick before shutting the case, otherwise, the rigid joystick member could puncture the display screen.

The shaft portion of the joystick member 10 may also be made hollow and the joystick member 10 may be formed of a rigid polymer that is capable of bending when force is applied, such as the force from the laptop screen being shut closed.

In further embodiments, it is desirable to design the area where the joystick member 10 engages the shaft 12 by altering the material forming the inner surface 28 and/or diameter of the opening 26, to engage the shaft 12 tightly enough to remain in place while in use, but sufficiently loose to allow the bottom portion 22 to easily separate when force comparable to the force generated from the laptop screen closing against the joystick member 10 is applied.

In alternative embodiments, the bottom portion 22 of the joystick member 10 may be designed to engage and mate with the eraser button of the eraser style pointing device. With this embodiment, the user would not have to remove the eraser from the shaft and may attach the joystick member 10 directly to the upper part of the eraser portion of the pointing device. In still further embodiments, the eraser button may be modified to more easily mate with a joystick member. For instance, the upper part of the eraser button may be specially designed or shaped to easily mate with the bottom portion 22 of the joystick member 10, or have an opening in which an extension on the bottom of the joystick member 10 may be inserted.

Figure 5A:
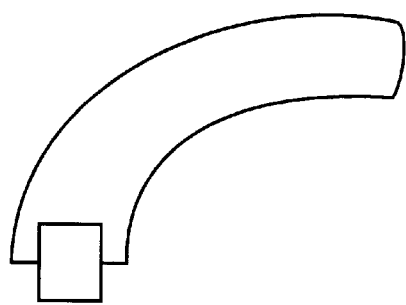
FIGS. 5a, b, c, and d are side views of alternative shapes for the joystick member in accordance with preferred embodiments of the present invention.
Figure 5B:
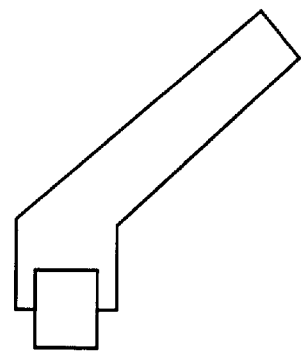
Figure 5C:
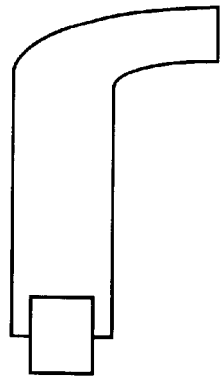

The joystick member 10 may have many shapes. FIG. 2 illustrates a shape similar to the control stick on a helicopter, airplane and other vehicles. FIGS. 5a, b, c, and d illustrate alternative shapes for the joystick member. Those skilled in the art will recognize that numerous other shapes may be used. In preferred embodiments, the top of the joystick member, opposite the end engaged with the keyboard is angled away from the display screen. In laptop computer environments, this angled arrangement avoids the situation where the display screen will shut directly on the end of the joystick member, whereby the end of the joystick member 10 could puncture the display screen. By having the end of the joystick member 10 form an angle with respect to the vertical axis, the event of shutting the laptop closed will cause the display screen to contact a side of the joystick member, as opposed to the end of the joystick member 10, thereby reducing the likelihood that the joystick member will puncture the screen.

Figure 5D:
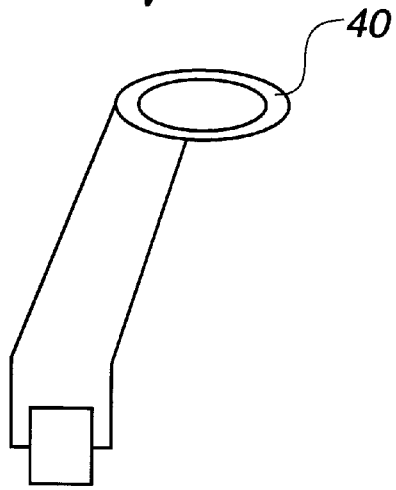

FIG. 5d illustrates an embodiment of the shape of the joystick member 10 where the end of the joystick member 10 has a loop 40, like a stirrup, through which a finger may be inserted. In this way, the user can control movement by moving the finger inserted in the loop 40.

In preferred embodiments, the outer diameter of the joystick member is constant throughout. In alternative embodiments, the outer diameter of the joystick may vary in sections. In preferred embodiments, the outer diameter of the joystick member is limited to being just slightly larger than the outer diameter of the shaft 12 to limit the amount of force, i.e., leverage, the user can apply to the shaft 12 via joystick member. Otherwise, if the outer diameter of the joystick member is significantly larger than the shaft 12, the joystick member may transfer enough user force to damage the shaft and sensor electronics in the keyboard.

In preferred embodiments, the joystick member is two to three inches long. This length is sufficient to allow the user to control the movement of the joystick member by holding the sides of the joystick member between two finger tips, such as the thumb and forefinger. The length may be shortened, say to one inch, but should be long enough to allow a user to easily grip the joystick between two finger tips. However, increasing the length substantially could provide the user enough leverage such that a normal user movement could damage the shaft and sensor electronics in the keyboard. Thus, the length is limited to avoid providing too much leverage to the user.

Preferred embodiments provide a joystick mechanism that is attachable to a keyboard port for controlling a cursor or another display graphical element, such as a game display element. The joystick member of the preferred embodiments is especially suited for engagement with the shaft provided for the eraser style pointing device commonly used with laptop computers. This preferred structure would allow the joystick member of the preferred embodiments to be used with most laptop computers presently on the market. The joystick invention allows the user greater control over movement of the cursor or graphical element displayed on the monitor than is currently provided with the eraser-style pointing device commonly used with laptop computers. Preferred embodiments also utilize a resilient, flexible material to form the joystick member to avoid damaging a laptop display screen in the event the laptop screen is shut closed on the joystick member.

The joystick member of the preferred embodiments may also be used with a keyboard in a desktop computer system that includes the eraser style pointing device. In this way, the user may play computer games with greater control than provided by a mouse or keyboard keys. The joystick member disclosed herein is particularly useful if a stand alone joystick that connects to the computer via a serial game port is unavailable or otherwise undesirable to use. For instance, in the work environment, the user may want to play computer games in a discrete manner so as not to draw attention to the activity. Using a large stand alone joystick would more likely be noticed by others. Alternatively, a user may be in a limited space or environment, such as an airline seat, where use of a joystick would be impractical. In this environment, the preferred joystick embodiment would be particularly useful as the user may have joystick-like control without the need of a table or other support means that a large stand-alone joystick requires.

Alternative Embodiments and Conclusions

This concludes the description of the preferred embodiments of the invention. The following describes some alternative embodiments for accomplishing the present invention.

Preferred embodiments described the joystick member coupled to a shaft that communicates with sensor electronics to translate mechanical movement to electric signals that may be transmitted to a computer to control the movement of a graphical element displayed on the monitor. In alternative embodiments, the keyboard may include a port to which the joystick member may mate directly. In this way, the joystick would be inserted into the port. In such case, the port would include sensor electronics to sense the mechanical movement of the joystick member. The port may be located on the surface of the keyboard or other area readily accessible to the user.

Preferred embodiments described the joystick member coupled between keys on a computer keyboard. In alternative embodiments, the joystick member may be attached to the keyboard or located on an extension of the keyboard in a region not between keys. For instance, the joystick member may be utilized with a mouse pointer, such as the IBM TrackPoint mouse, that includes an eraser style pointing device near the mouse buttons.

In preferred embodiments, the joystick member is used to control movement of a graphical element on a display screen, such as a pointer. However, in alternative embodiments, the joystick member may be used to enter input and control computer operations that are not visibly observable on a display monitor.

In summary, preferred embodiments in accordance with the present invention disclose a pointer assembly apparatus in communication with sensor electronics embedded within a keyboard assembly to sense mechanical movement. The sensor electronics communicates electrical signals indicating direction of movement to a computer system which controls the movement of a graphical element displayed on a display monitor attached to the computer. The pointer assembly comprises an extended member coupled to the sensor electronics that extends at least one-half an inch away from a horizontal surface of the keyboard assembly. With this structure, the user may grip the extended member between two finger tips.

The foregoing description of the preferred embodiments of the invention has been presented for the purposes of illustration and description. It is not intended to be exhaustive or to limit the invention to the precise form disclosed. Many markings and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A pointer assembly in communication with sensor electronics embedded between keyboard keys within a keyboard assembly to sense mechanical movement, wherein the sensor electronics communicate electrical signals indicating direction of movement to a computer system to control the movement of a graphical element displayed on a display monitor attached to the computer system, comprising:

an extended member capable of being coupled to the sensor electronics, wherein the extended member extends at least one-half an inch away from a horizontal surface of the keyboard assembly when coupled to the sensor electronics, whereby the user can grip the extended member between two finger tips;

an eraser style pointer; and a shaft member disposed between the keyboard keys and coupled to the sensor electronics at one end, wherein the eraser style pointer is attached to the shaft member, and wherein an engagement end of the extended member has a configuration to enable detachment and engagement with the eraser style pointer, whereby the shaft member communicates mechanical movement from the extended member to the sensor electronics.

2. The pointer assembly of claim 1, wherein the engagement end of the extended member has an outer diameter greater than an outer diameter of the shaft member, and wherein the engagement end of the extended member forms an opening capable of mating with the shaft member.

3. The pointer assembly of claim 1, wherein the extended member is comprised of a polymer material that provides for resilience and flexibility.

4. The pointer assembly of claim 3, wherein the computer system is a laptop computer and the display monitor is a laptop screen, and wherein polymer forming the extended member is designed to deform in response to stress from the laptop screen being closed shut onto the extended member and to return to an original shape after the stress is removed.

5. The pointer assembly of claim 1, wherein the extended member is between three and five inches in length.

6. The pointer assembly of claim 1, wherein the engagement end of the extended member is disposed between keys on the keyboard assembly.

7. The pointer assembly of claim 6, wherein the keyboard is disposed within a portable computer, wherein the keyboard and screen are flush when the portable computer is in a closed position, and wherein the extended member is further formed of a resilient, flexible polymer that is designed to bend in response to stress resulting from the screen contacting the extended member when the portable computer is being adjusted to the closed position.

8. The pointer assembly of claim 1, wherein the extended member is hollow.

9. A pointer assembly in communication with sensor electronics embedded within a keyboard assembly to sense mechanical movement, wherein the sensor electronics communicates electrical signals indicating direction of movement to a computer system to control the movement of a graphical element displayed on a display monitor attached to the computer system, comprising:

an extended member capable of being coupled to the sensor electronics, wherein the extended member extends at least one-half an inch away from a horizontal surface of the keyboard assembly when coupled to the sensor electronics, whereby the user can grip the extended member between two finger tips;

a shaft member disposed within the keyboard assembly and coupled to the sensor electronics at one end, and wherein an engagement end of the extended member is engaged to the shaft member, whereby the shaft member communicates mechanical movement from the extended member to the sensor electronics; and wherein an inner surface of the engagement end of the extended member that engages the shaft member is formed of a polymer that forms a resilient, flexible material.

10. The pointer assembly of claim 9, wherein at least a portion of the extended member is formed of a brittle polymer that is susceptible to shatter when subjected to stress.

11. The pointer assembly of claim 10, wherein the brittle polymer portion of the extended member is more brittle than a polymer forming the shaft member.

12. The pointer assembly of claim 10, wherein the computer system is a laptop computer and the display monitor is a laptop screen, and wherein the extended member is designed to shatter in response to stress resulting from the laptop screen contacting the extended member when the portable computer is being adjusted to the closed position.

13. The pointer assembly of claim 12, wherein the extended member is designed to shatter at a point where the extended member extends above a horizontal surface of the keyboard assembly in response to the stress resulting from the laptop screen being closed shut onto the extended member.

14. A pointer assembly in communication with sensor electronics embedded within a keyboard assembly to sense mechanical movement, wherein the sensor electronics communicates electrical signals indicating direction of movement to a computer system to control the movement of a graphical element displayed on a display monitor attached to the computer system, comprising:

an extended member capable of being coupled to the sensor electronics, wherein the extended member extends at least one-half an inch away from a horizontal surface of the keyboard assembly when coupled to the sensor electronics, whereby the user can grip the extended member between two finger tips, wherein the extended member forms a control stick shape by extending upward from a horizontal surface of the keyboard assembly, then immediately extending substantially horizontally across the horizontal surface of the keyboard assembly, and then extending substantially vertically upward from the horizontal surface of the keyboard assembly.

15. A pointer assembly in communication with sensor electronics embedded within a keyboard assembly to sense mechanical movement, wherein the sensor electronics communicates electrical signals indicating direction of movement to a computer system to control the movement of a graphical element displayed on a display monitor attached to the computer system, comprising:

an extended member capable of being coupled to the sensor electronics, wherein the extended member extends at least one-half an inch away from a horizontal surface of the keyboard assembly when coupled to the sensor electronics, whereby the user can grip the extended member between two finger tips, wherein an end of the extended member opposite an end coupled to the keyboard forms a loop through which a finger may be inserted.

16. A pointer assembly in communication with sensor electronics embedded within a keyboard assembly to sense mechanical movement, wherein the sensor electronics communicates electrical signals indicating direction of movement to a computer system to control the movement of a graphical element displayed on a display monitor attached to the computer system, comprising:

an extended member capable of being coupled to the sensor electronics, wherein the extended member extends at least one-half an inch away from a horizontal surface of the keyboard assembly when coupled to the sensor electronics, whereby the user can grip the extended member between two finger tips, wherein the extended member extends vertically away from a horizontal surface of the keyboard assembly and then extends at an angle from a vertical axis perpendicular to the horizontal surface of the keyboard assembly.

17. A keyboard assembly for generating display control signals in response to user movement to a computer system to control the movement of a graphical element displayed on a display monitor attached to the computer system, comprising:

a support means in communication with the computer system;

sensor means disposed within the support means to sense mechanical movement and transform mechanical movement into electronic signals for transmittal to the computer system;

eraser pointing means;

keyboard keys;

joystick means for controlling the movement of a graphical element displayed on the monitor; and a shaft means disposed between the keyboard keys, wherein the eraser pointing means is attached to the shaft means, wherein the joystick means has a configuration to enable detachment and engagement with the eraser pointing means, and wherein the shaft means is capable of communicating mechanical movement from the joystick means to the sensor means, wherein the shaft means is coupled to the sensor means.

18. The keyboard assembly of claim 17, wherein computer system and keyboard assembly are enclosed within a portable computer housing.

* * * * *